US009760582B2

(12) United States Patent
Hatori et al.

(10) Patent No.: US 9,760,582 B2
(45) Date of Patent: Sep. 12, 2017

(54) INFORMATION PROCESSING APPARATUS AND INFORMATION PROCESSING METHOD

(71) Applicant: CANON KABUSHIKI KAISHA, Tokyo (JP)

(72) Inventors: Kenji Hatori, Yokohama (JP); Hideo Takiguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 332 days.

(21) Appl. No.: 13/951,978

(22) Filed: Jul. 26, 2013

(65) Prior Publication Data
US 2014/0040187 A1 Feb. 6, 2014

(30) Foreign Application Priority Data
Jul. 31, 2012 (JP) .................................. 2012-170194

(51) Int. Cl.
G06F 17/30 (2006.01)
G06K 9/00 (2006.01)

(52) U.S. Cl.
CPC ..... *G06F 17/3028* (2013.01); *G06K 9/00288* (2013.01); *G06K 9/00926* (2013.01)

(58) Field of Classification Search
CPC ............ G06F 17/3028; G06K 9/00288; G06K 9/00926
See application file for complete search history.

(56) References Cited

U.S. PATENT DOCUMENTS

| | | | |
|---|---|---|---|
| 6,583,813 B1* | 6/2003 | Enright et al. | 348/150 |
| 2003/0172284 A1* | 9/2003 | Kittler | G06K 9/6235 713/186 |
| 2005/0151842 A1* | 7/2005 | Oohashi | G06K 9/00664 348/86 |
| 2006/0140455 A1* | 6/2006 | Costache | G06F 17/30259 382/118 |
| 2006/0204050 A1* | 9/2006 | Takizawa | G06K 9/00288 382/115 |
| 2008/0123907 A1* | 5/2008 | Eura | G06K 9/00288 382/118 |
| 2008/0137918 A1* | 6/2008 | Eura | G06K 9/6255 382/118 |
| 2009/0175510 A1* | 7/2009 | Grim, III | G06F 17/30262 382/118 |
| 2010/0067750 A1* | 3/2010 | Matsuo | G06F 17/30265 382/118 |
| 2011/0243398 A1* | 10/2011 | Suzuki | G06K 9/00288 382/118 |

FOREIGN PATENT DOCUMENTS

JP 2002-269563 A 9/2002

\* cited by examiner

*Primary Examiner* — Tarek Chbouki
(74) *Attorney, Agent, or Firm* — Canon U.S.A., Inc. IP Division

(57) ABSTRACT

An information processing apparatus includes a storage unit configured to store a face dictionary for performing face authentication, and a processing unit configured to update the face dictionary stored in the storage unit, wherein the processing unit controls updating of the face dictionary based on the number of images from among stored images corresponding to a person registered with the face dictionary.

17 Claims, 12 Drawing Sheets

FIG.3
| NAME | YAMADA TARO | | |
|---|---|---|---|
| REGISTERED FACE 1 | FACE IMAGE | 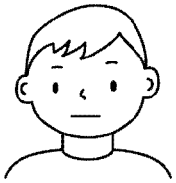 | FEATURE AMOUNT DATA |
| REGISTERED FACE 2 | FACE IMAGE |  | FEATURE AMOUNT DATA |
| REGISTERED FACE 3 | FACE IMAGE |  | FEATURE AMOUNT DATA |
| REGISTERED FACE 4 | FACE IMAGE |  | FEATURE AMOUNT DATA |
| REGISTERED FACE 5 | FACE IMAGE |  | FEATURE AMOUNT DATA |

FIG.6

| 602 | PERSON A | PERSON B | | PERSON Z |
|---|---|---|---|---|
| FACE 000001 | 51 | 235 | | 35 |
| FACE 000002 | 180 | 89 | | 102 |
| FACE 000003 | 226 | 96 | .... | 59 |
| FACE 000004 | 226 | 84 | | 91 |
| FACE 000005 | 78 | 196 | | 47 |
| ⋮ | ⋮ | ⋮ | | ⋮ |
| FACE 100000 | 195 | 54 | .... | 63 |

FIG.7

| NUMBER OF IMAGES AT TIME OF FACE DICTIONARY UPDATING | 10 | | | | ~701 |
|---|---|---|---|---|---|
| NUMBER OF PERSON IMAGES | 13 | | | | ~702 |
| NAME | YAMADA TARO | | | | ~703 |
| REGISTERED FACE 1 | FACE IMAGE |  | FEATURE AMOUNT DATA | c:¥Image¥....¥IMG0023.jpg | |
| REGISTERED FACE 2 | FACE IMAGE |  | FEATURE AMOUNT DATA | c:¥Image¥....¥IMG1025.jpg | |
| REGISTERED FACE 3 | FACE IMAGE |  | FEATURE AMOUNT DATA | c:¥Image¥....¥IMG3301.jpg | |
| REGISTERED FACE 4 | FACE IMAGE |  | FEATURE AMOUNT DATA | D:¥Photo¥....¥IMG48931.jpg | |
| REGISTERED FACE 5 | FACE IMAGE |  | FEATURE AMOUNT DATA | D:¥Photo¥....¥IMG0587.jpg | |

705　704　706

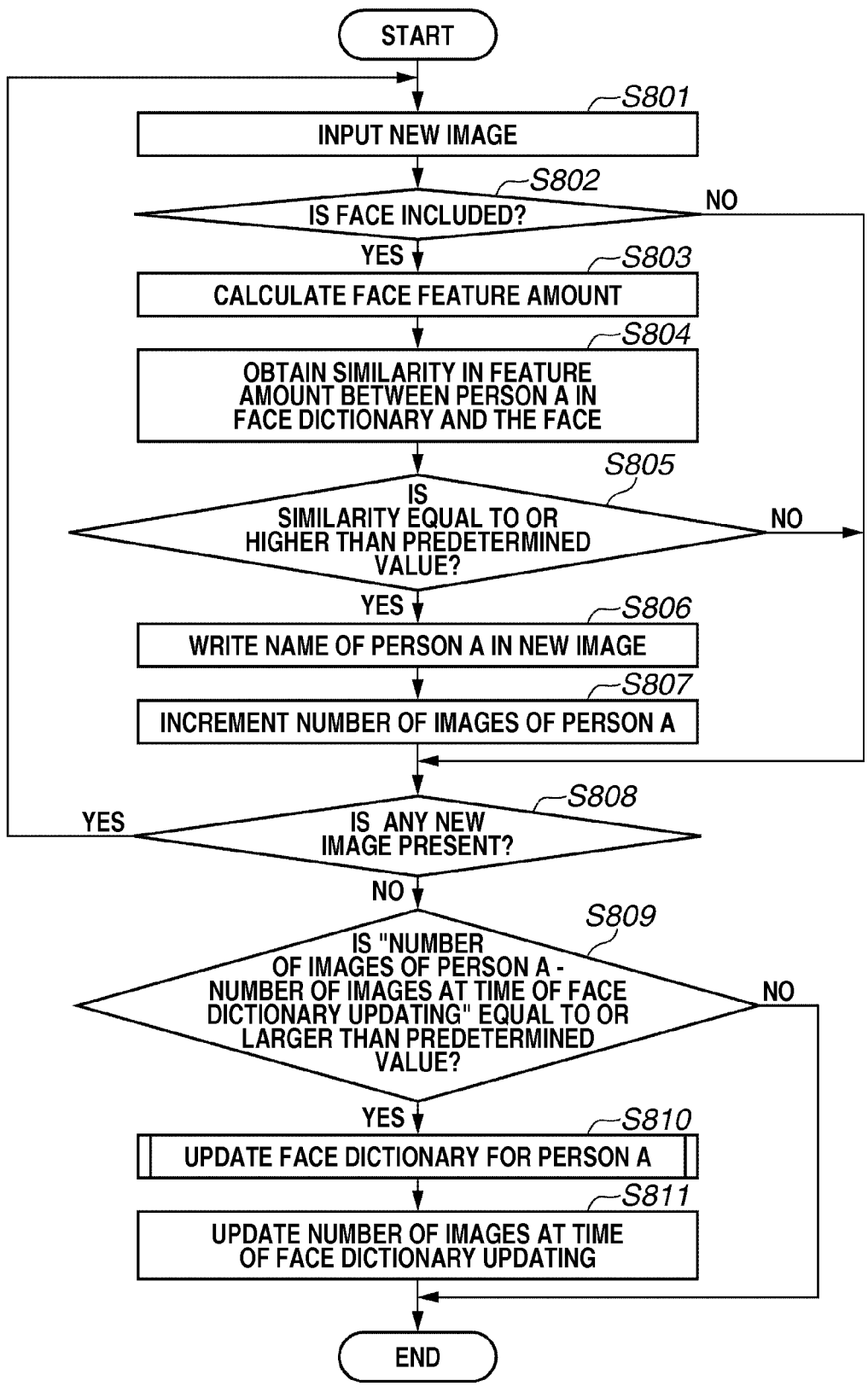

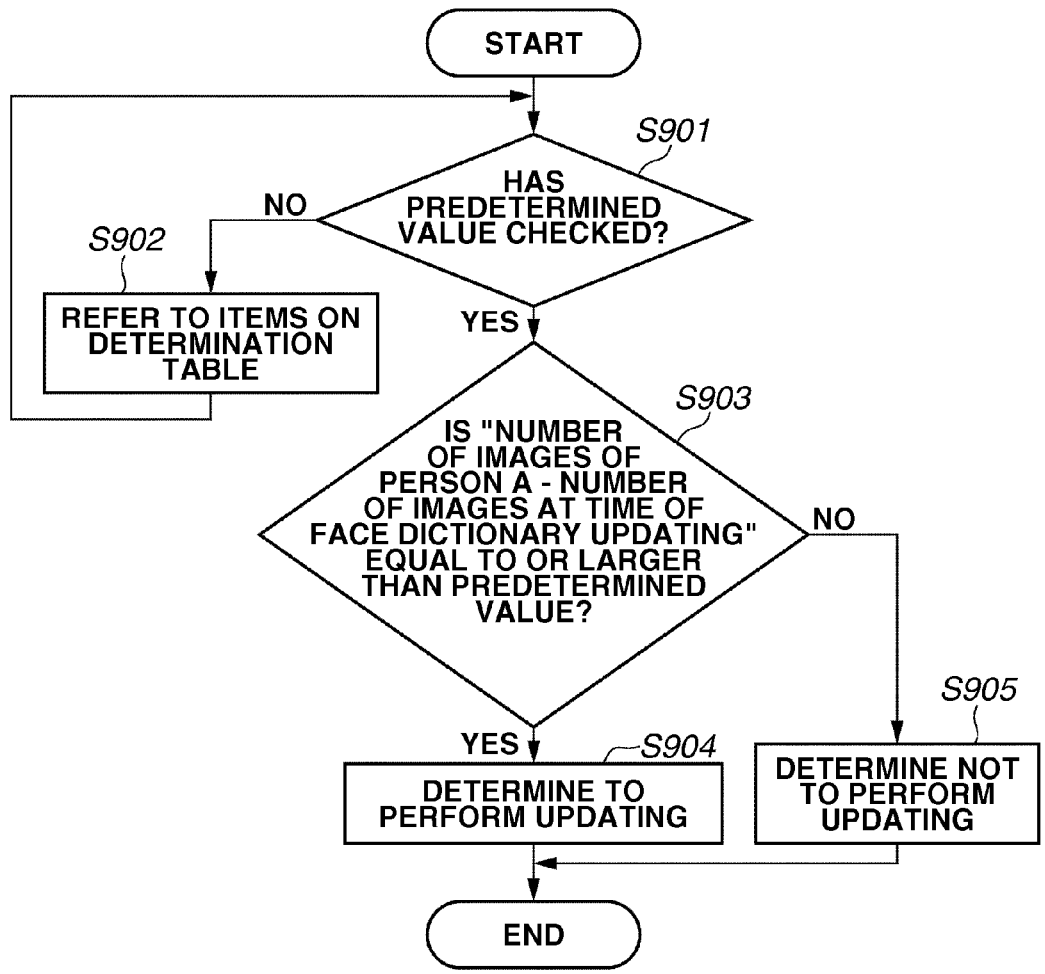

INFORMATION PROCESSING APPARATUS AND INFORMATION PROCESSING METHOD

BACKGROUND

Field

Aspects of the present invention generally relate to an information processing apparatus suitably used especially for updating a face dictionary used for face authentication, an information processing method, and a storage medium.

Description of the Related Art

Recently, a face detection technology for detecting a face portion from an image and a face authentication technology for specifying a person have been put into practical use. An application used in a personal computer (PC) performs face detection and face authentication on images stored in the PC, and information about the name of a person is added to an image. Thus, the image can be searched for by the name.

For the face authentication, a dictionary referred to as a face dictionary is used. With the face dictionary, the name of the person and face feature amount data for determining the person are registered. In the face authentication, a face is detected from the image to obtain face feature amount data, and similarity between the face feature amount data and the face feature amount data registered with the face dictionary is calculated. Then, when the similarity is equal to or higher than a predetermined value, the detected face is determined to be that of the person registered with the face dictionary. The face dictionary is created by selecting some of images to which the same name of a person has been added. When images to which the same name of a person has been added increase, some are further selected from these images to update the face dictionary.

FIG. 3 illustrates an example of data registered with a conventional face dictionary. The example illustrated in FIG. 3 is the face dictionary of a person A named "YAMADA TARO". The dictionary includes up to five pieces of face image data and feature amount data extracted from the face image data.

However, it takes long to update such a face dictionary. Thus, for example, Japanese Patent Application Laid-Open No. 2002-269563 discuses a technology for updating the face dictionary at specific timing. According to the technology discussed in Japanese Patent Application Laid-Open No. 2002-269563, the face dictionary is updated in accordance with a predetermined rule based on information about the date of image capturing. For example, updating is performed in accordance with a rule of preferentially updating the face dictionary from a latest image.

When an image of a certain person is searched for, if the similarity of data of persons included in previously managed images is registered with a database (DB), only images having similarity equal to or higher than a predetermined value need to be extracted. Thus, searching to be performed next time can be faster.

FIG. 6 illustrates an example of a face similarity DB created for the managed images. For example, a face feature amount in the image is compared with a feature amount registered with the face dictionary to obtain correlation (similarity), and a result is registered with the face similarity DB.

In FIG. 6, horizontally-aligned columns 601 indicate a list of persons registered with the face dictionary, and vertically-aligned rows 602 indicate a list of faces in the managed images. For example, similarity 603 in feature amount between a person A registered with the face dictionary and a "face 000001" is "51". Thus, feature amounts of all the persons registered with the face dictionary are compared with feature amounts of all the faces in each image to calculate similarity. When an instruction of searching for a face of a person identical to the person A is received, a face having similarity equal to or higher than a predetermined value, for example, a face of having similarity of 200 or higher, is estimated as the person A, and extracted as a searching result.

As described above, long processing time is necessary for updating the face dictionary. When the face dictionary is updated, the similarity registered with the face similarity DB illustrated in FIG. 6 also changes. Consequently, since the data stored in the face similarity DB needs to be discarded to calculate new similarity, and its result needs to be registered again in the face similarity DB, much longer time is expended.

In the case of the example illustrated in FIG. 6, when the face dictionary of the person A is changed, similarity needs to be calculated again from the "face 000001" to a "face 100000". Such frequent updating of the face dictionary is not so favorable because a searching speed decreases.

According to the method described in Japanese Patent Application Laid-Open No. 2002-269563, based on image capturing date information, the face dictionary is updated following addition of a new image. Thus, each time an image captured by a camera is loaded into the PC, the face dictionary is updated. Consequently, in a general operation flow where the image captured by the camera is loaded into the PC and is displayed, the face dictionary is updated for each loading.

SUMMARY

Aspects of the present invention are generally directed to an information processing apparatus that solves all or at least one of the aforementioned issues.

According to an aspect of the present invention, an information processing apparatus includes a storage unit configured to store a face dictionary for performing face authentication, and a processing unit configured to update the face dictionary stored in the storage unit, wherein the processing unit controls updating of the face dictionary based on the number of images from among stored images corresponding to a person registered with the face dictionary.

Further features of the present invention will become apparent from the following description of exemplary embodiments with reference to the attached drawings.

BRIEF DESCRIPTION OF THE DRAWINGS

FIG. 3 is a diagram illustrating an example of data registered with a conventional face dictionary.

FIG. 6 is a diagram illustrating an example of a face similarity DB created for a managed image.

FIG. 7 is a diagram illustrating an example of a data structure of the face dictionary according to the present exemplary embodiment.

FIG. 8 is a flowchart illustrating an example of a processing procedure for determining updating of the face dictionary illustrated in FIG. 7 according to a first to a third exemplary embodiments.

FIGS. 9A and 9B are a diagram illustrating a table defining predetermined values, and a flowchart illustrating an example of a detailed procedure of processing for determining whether a difference in step S809 illustrated in FIG. 8 is equal to or larger than a predetermined value, according to the second exemplary embodiment, respectively.

DESCRIPTION OF THE EMBODIMENTS

Figure 1:
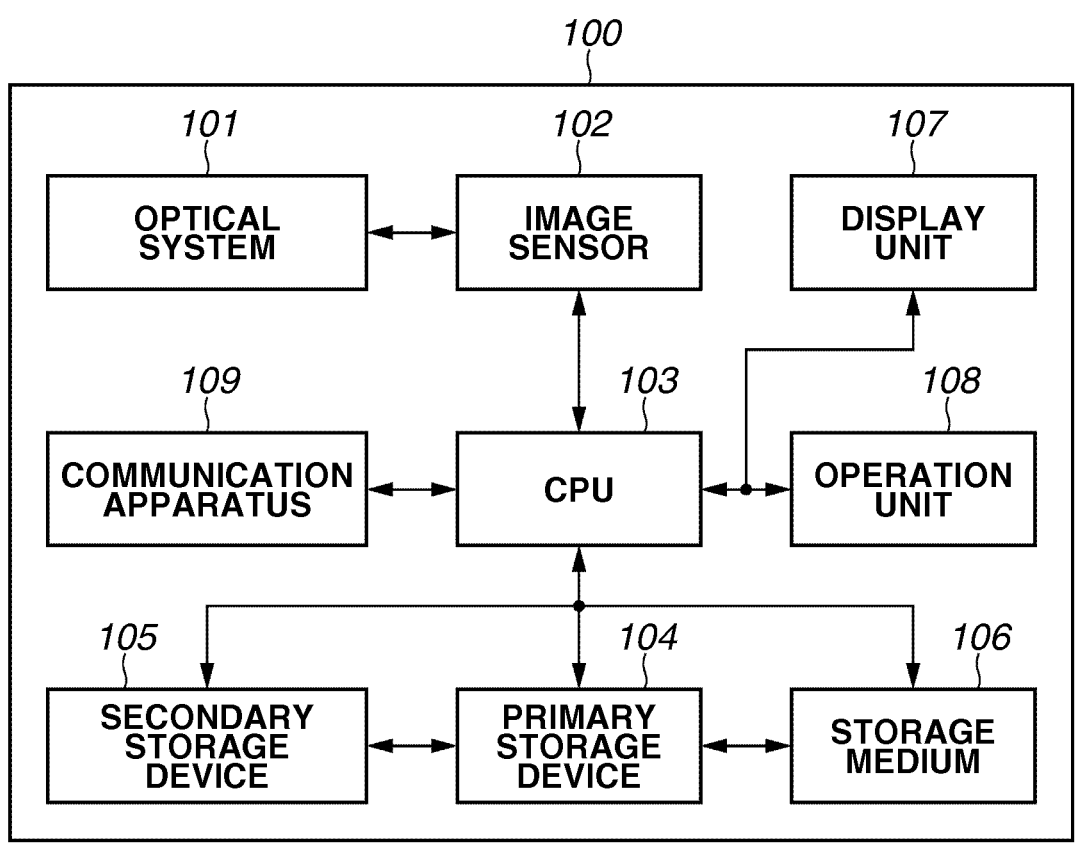
FIG. 1 is a block diagram illustrating a configuration of an imaging apparatus according to an exemplary embodiment.

Hereinafter, a first exemplary embodiment will be described referring to the drawings.

FIG. 1 is a block diagram illustrating a configuration of an imaging apparatus 100 according to the present exemplary embodiment.

In FIG. 1, the imaging apparatus 100 of the present exemplary embodiment includes an optical system 101, an image sensor 102, a central processing unit (CPU) 103, a primary storage device 104, a secondary storage device 105, a storage medium 106, a display unit 107, an operation unit 108, and a communication apparatus 109.

The optical system 100 includes a lens, a shutter, and a diaphragm, and forms on the imager sensor 102 an image of light from an object with an appropriate amount and at appropriate timing. The image sensor 102 converts the light passed through the optical image to form the image into an image. The CPU 103 performs various calculations and control of each unit of the imaging apparatus 100 according to an input signal and a program. The primary storage device 104, which stores temporary data, is used for work of the CPU 103. The secondary storage device 105 stores a program (firmware) for controlling the imaging apparatus 100 and various pieces of setting information.

The storage medium 106 stores captured image data and a face dictionary. The storage medium 106 is removable after photographing, and loaded into the PC to enable data reading. In other words, the imaging apparatus 100 is only required to have an access to the stage medium 106, and read/write data from/in the storage medium 106. The face dictionary is stored in the storage medium 106. However, the face dictionary may be stored in the secondary storage medium 105.

The display unit 107 displays a view finder image during photographing, a captured image, and a character for a dialog operation. The display unit 107 also displays an operation screen for registering data with a face dictionary, and the registered face dictionary. The operation unit 108 is for receiving a user's operation. For the operation unit 108, for example, a button, a lever, or a touch panel may be used.

The communication apparatus 109 is connected to an external apparatus to transmit and receive a control command and data. As a protocol for establishing connection and performing data communication, for example, a picture transfer protocol (PTP) or a media transfer protocol (MTP) is used. The communication apparatus 109 may perform communication by wired connection such as a universal serial bus (USB) cable. The communication apparatus 109 may perform communication by wireless connection such as a wireless local area network (LAN). Further, the communication apparatus 109 may be directly connected to the external apparatus, or may be connected to the external apparatus via a server or a network, such as the Internet.

The configuration of the imaging apparatus 100 has been described. However, similar processing may be performed by a PC serving as an information processing apparatus. Hereinafter, a configuration of the PC will be described.

Figure 2:
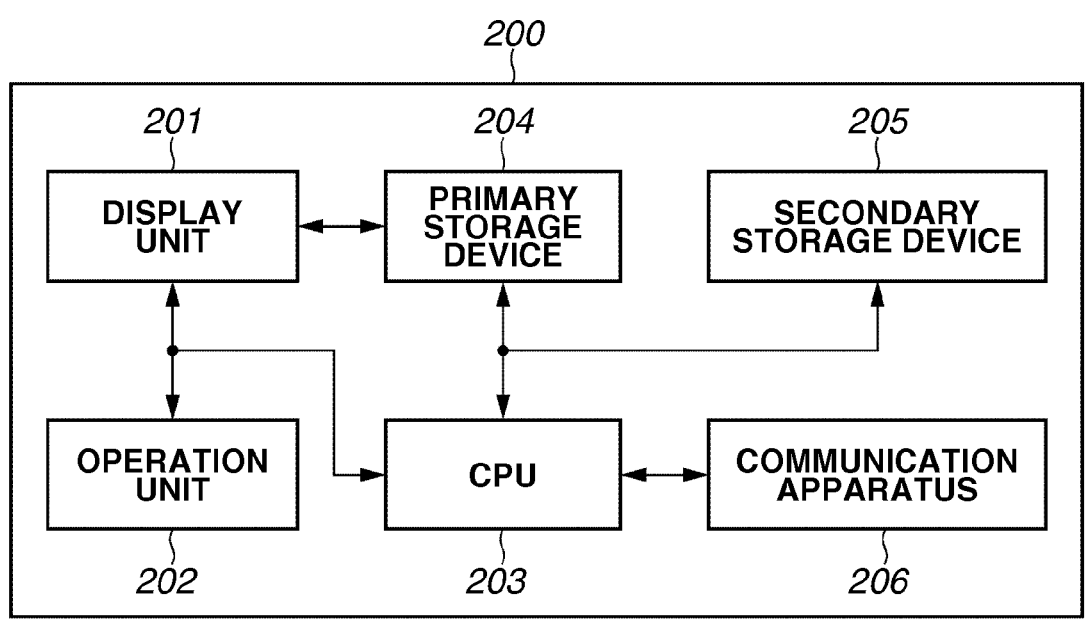
FIG. 2 is a block diagram illustrating a configuration example of a PC according to the exemplary embodiment.

FIG. 2 is a block diagram illustrating a configuration example of the PC according to the present exemplary embodiment.

In FIG. 2, the PC 200 includes a display unit 201, an operation unit 202, a CPU 203, a primary storage device 204, a secondary storage device 205, and a communication apparatus 206. Basic functions of the components from the display unit 201 to the communication apparatus 206 are similar to those of the imaging apparatus 100, and thus, detailed description will not be repeated. For the display unit 201, a display device such as a liquid crystal display (LCD) is used. The PC 200 does not need to include the display unit 201, but is only required to have a display control function for controlling displaying of the display unit 201. Further, for the operation unit 202, a keyboard or a mouse may be used. For example, the operation unit 202 is used for inputting a name of a person to the face dictionary.

A procedure for updating a face dictionary by a conventional method will be described.

Figure 4:
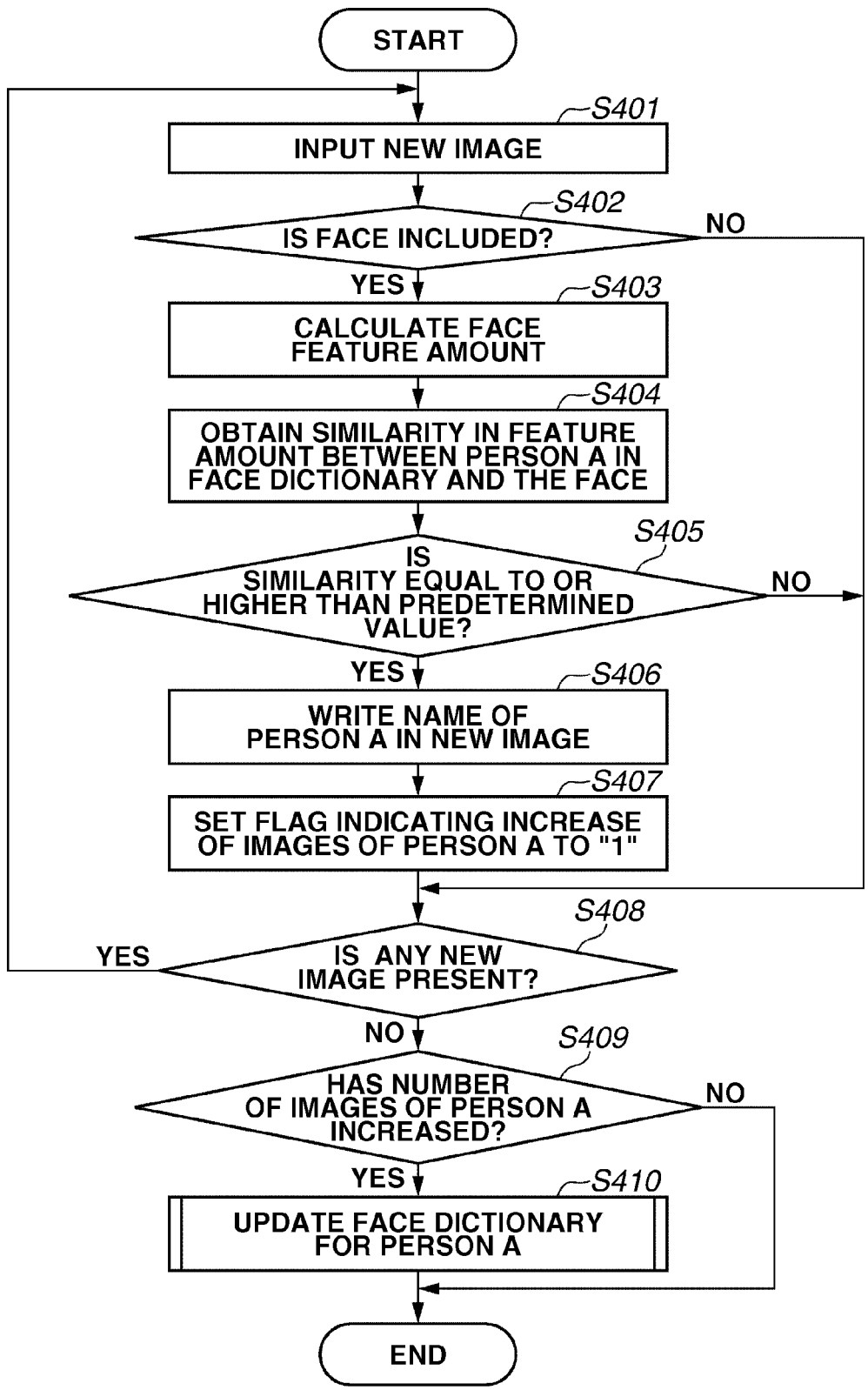
FIG. 4 is a flowchart illustrating an example of a processing procedure for determining updating of the conventional face dictionary.

FIG. 4 is a flowchart illustrating an example of a processing procedure for determining updating of the face dictionary illustrated in FIG. 3. Hereinafter, the processing will be described by taking an example of a person A registered with the face dictionary.

First, in step S401, a new image is input. Then, in step S402, whether any face is included in the image is checked. When a result of checking shows that a face is included (YES in step S402), the processing proceeds to step S403. In step S403, a feature amount of the face is calculated. When no face is included (NO in step S402), the processing proceeds to step S408.

Then, in step S404, similarity is calculated from the feature amount calculated in step S403 and the feature amount of the person A registered with the face dictionary. In step S405, it is determined whether the similarity is greater than or equal to a predetermined value. When the similarity is greater than or equal to the predetermined value (YES in step S405), the face is determined to be that of the person A. In step S406, a name "YAMADA TARO" is written in metadata of the image. In step S407, a flag indicating an increase of images of the person A is set to "1". In step S408, whether any new image is present is determined, and the processing is repeated until no more new image is present. Then, in step S409, whether a number of images of the person A has increased is determined by checking the flag. When it is determined that the number of images of the person A has not increased (NO in step S409), the processing is ended. When it is determined that the number of images of the person A has increased (YES in step S409), in step S410, the face dictionary of the person A is updated.

Figure 5:
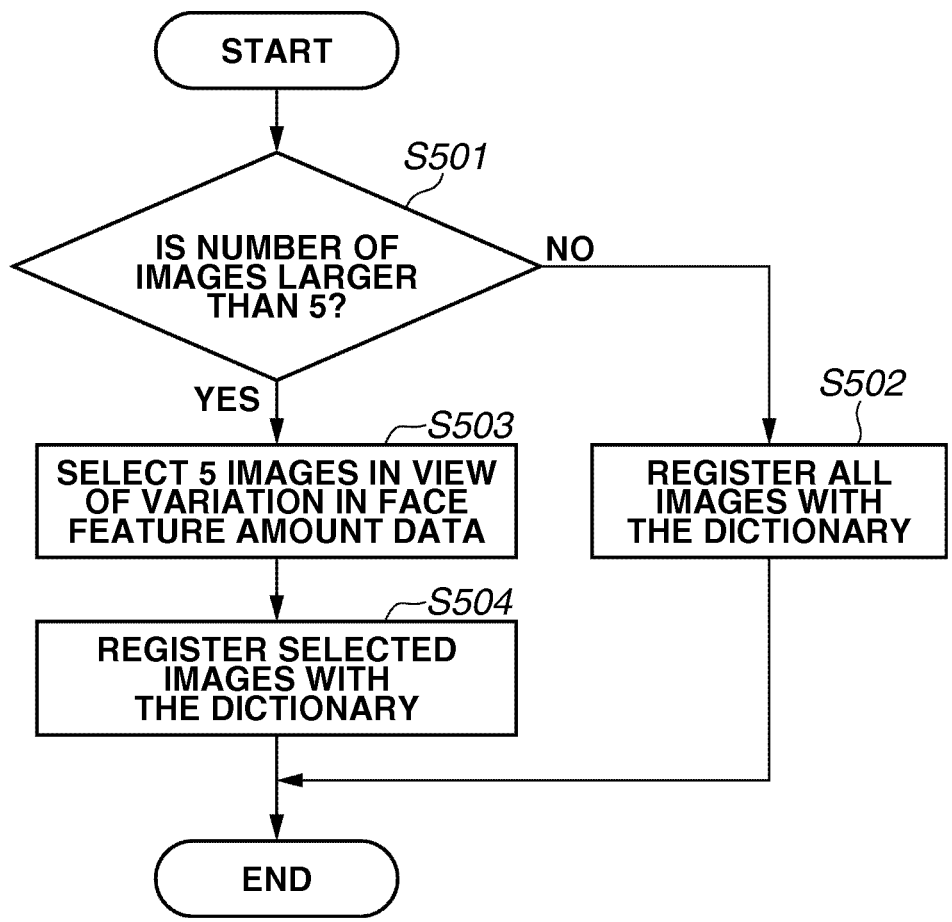
FIG. 5 is a flowchart illustrating an example of a processing procedure for updating a face dictionary.

FIG. 5 is a flowchart illustrating an example of a processing procedure for updating the face dictionary in step S410.

First, in step S501, whether a total number of images registered with the face dictionary and images having flags set to 1 in the processing illustrated in FIG. 4 is greater than a predetermined number, for example, 5, is determined. When it is determined that the total number of images is less than or equal to 5 (NO in step S501), in step S502, all the images are registered with the face dictionary. For example, as illustrated in FIG. 3, face image data and face feature amount data are registered with the face dictionary.

When it is determined that the total number of images is greater than 5 (YES in step S501), in step S503, face feature amount data similar to one another are eliminated, and 5 images are selected from feature amount data different from one another. In step S504, the selected images are registered with the face dictionary. Specifically, as illustrated in FIG. 3, the face image data and the face feature amount data are registered with the face dictionary.

Thus, in the conventional case, when the face dictionary is updated, longer processing time is necessary. When the face dictionary is updated, similarity to be registered with a face similarity DB illustrated in FIG. 6 also changes. Since data stored in the face similarity DB needs to be discarded to calculate new similarity, and its result needs to be registered again in the face similarity DB, much longer time is expended. Thus, in the present exemplary embodiment, a procedure for controlling timing of updating the face dictionary to shorten processing time will be described.

FIG. 7 illustrates a data structure of the face dictionary according to the present exemplary embodiment. In FIG. 7, the number of images of the person A at the time of last updating of the face dictionary is registered with an item 701, and the number of images of the person A at the present time is registered with an item 702. A name of the person A is registered with an item 703. Feature amount data is registered with an item 704, and face image data is registered with an item 705. A pathname of an image is registered with an item 706.

FIG. 8 is a flowchart illustrating an example of a processing procedure for determining updating of the face dictionary illustrated in FIG. 7, according to the present exemplary embodiment. In all the flowcharts described below, the CPU 103 of the imaging apparatus 100 illustrated in FIG. 1 performs the processes. Processing for detecting a face and processing for calculating a feature amount in face authentication are performed by a known method. Hereinafter, the processing will be described by taking the example of the person A registered with the face dictionary.

First, in step S801, a new image is obtained via the optical system 101 and the image sensor 102. In step S802, face detection processing is performed to check whether a face is included in the image. When it is determined that a face is included (YES in step S802), the processing proceeds to step S803. If not (NO in step S802), the processing proceeds to step S808. The obtained image is stored in the storage medium 106.

In step S803, a feature amount of the face is calculated. In step S804, the feature amount calculated in step S803 is compared with the feature amount of the person A registered with the face dictionary and stored in the storage medium 106 to calculate similarity. Then, in step S805, whether the similarity calculated in step S804 is greater than or equal to a predetermined value is determined. When the similarity is greater than or equal to the predetermined value (YES in step S805), this face is determined to be that of the person A. In step S806, a name "YAMADA TARO" is written in metadata of the image obtained in step S801. In step S807, the number of images of the person A is incremented by one. Specifically, "+1" is added to the number in the item 702 of the face dictionary of the person A.

Then, in step S808, whether any new image is present is determined. When it is determined that a new image is present (YES in step S808), the processing returns to step S801 to be repeated. If not (NO in step S808), in step S809, a difference between the number of images of the person A in the item 702 and the number of images at the time of updating in the item 701 illustrated in FIG. 7 is calculated. Whether the difference is greater than or equal to a predetermined value is determined. When it is determined that the difference is less than the predetermined value (NO in step S809), the processing ends. On the other hand, when it is determined that the difference is greater than or equal to the predetermined value (YES in step S809), in step S810, the face dictionary of the person A is updated. A procedure for updating the face dictionary is similar to that illustrated in FIG. 5. Then, in step S811, the number of images of the item 701 is updated to that of the item 702 illustrated in FIG. 7.

Figure 12:
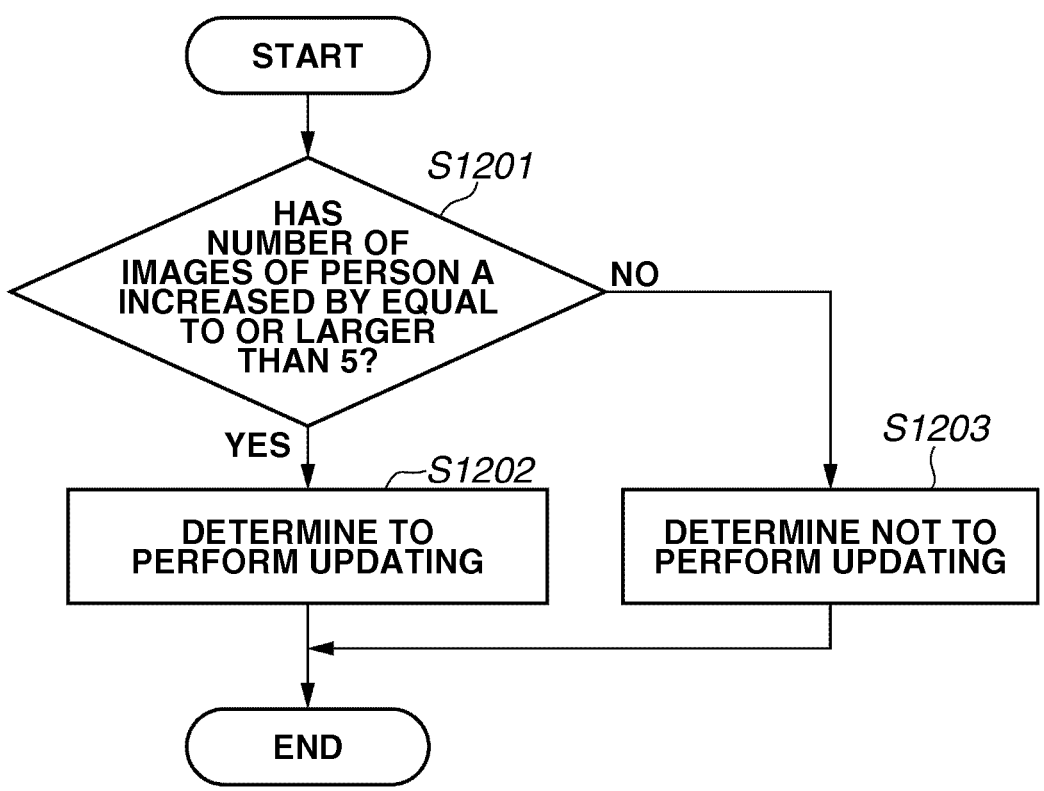
FIG. 12 is a flowchart illustrating an example of a detailed procedure of processing for determining whether the difference in step S809 illustrated in FIG. 8 is equal to or larger than the predetermined value according to the first exemplary embodiment.

FIG. 12 is a flowchart illustrating an example of a detailed procedure of processing for determining whether the difference in step S809 illustrated in FIG. 8 is greater than or equal to the predetermined value, according to the present exemplary embodiment. First, in step S1201, a difference between the number of images of the person A in the item 702 and the number of images at the time of last updating in the item 701 illustrated in FIG. 7 is calculated. In the present exemplary embodiment, whether the difference is greater than or equal to 5 is checked. When the difference is greater than or equal to 5 (YES in step S1201), in step S1202, it is determined to perform updating processing on the face dictionary of the person A in step S810. In other words, it is determined to be YES in step S809. On the other hand, when the difference is less than 5 (NO in step S1201), in step S1203, it is determined not to perform updating processing on the face dictionary of the person A in step S810. In other words, it is determined to be NO in step S809. When the number of images in the item 701 has not reached 5, the images up to 5 are all registered with the face dictionary, while the 6th image and subsequent images are subjected to the processing procedure illustrated in FIG. 12.

Thus, according to the present exemplary embodiment, rather than updating each time, an updating frequency can be appropriately suppressed. In the present exemplary embodiment, the updating processing of the face dictionary is performed when the difference between the number of images in the item 702 and the number of images in the item 701 is greater than or equal to 5. However, in the case of one new image, for example, when the number of images in the item 702 reaches a multiple of 5, the updating processing of the face dictionary may be performed. In this case, in step S807 illustrated in FIG. 8, the number of images of the person A is incremented. Then, the processing proceeds to step S809. In step S809, whether the number of images in the item 702 is a multiple of 5 is determined.

The case where the difference is 5 or greater has been described. The predetermined number is not limited to 5, and any numerical value can be used.

Next, a second exemplary embodiment will be described.

In the first exemplary embodiment, when 5 or more images are added after last updating of the face dictionary, updating of the face dictionary is performed. The present exemplary embodiment will be described by taking an example where updating timing changes depending on the number of images. A configuration of an imaging apparatus or a PC, a configuration of a face dictionary, and processing for updating the face dictionary, according to the present exemplary embodiment are similar to those of the first exemplary embodiment. In the preset exemplary embodiment, only differences from the first exemplary embodiment will be described.

Concerning updating of the face dictionary, when the number of images of the person A is small, it is desirable to frequently perform updating of the face dictionary where there is a variation in the face feature amount. However, when the number of images of the person A is larger, the face dictionary where there is a variation in the face feature amount is created. Thus, even with frequent updating, searching accuracy is not improved so greatly. Rather, disadvantages increase, such as longer processing time due to updating of the face dictionary. Thus, according to the present exemplary embodiment, as in the case of a determination table 911 illustrated in FIG. 9A, when the number of images 912 of the person A is 10 or less, the face dictionary is updated for each increase by one, and then, a predetermined value 913 is incremented corresponding to the number of images 912. For example, when the number of images 912 is from 51 to 100, the face dictionary is not updated before the number increases to 20.

FIG. 9B is a flowchart illustrating an example of a detailed procedure of processing for determining whether the difference in step S809 is greater than or equal to the predetermined value according to the present exemplary embodiment.

First, in step S901, whether the predetermined value 913 illustrated in FIG. 9A has been checked is determined. When it is determined that the predetermined value 913 has been checked (YES in step S901), the processing proceeds to step S903.

On the other hand, when it is determined that the predetermined value 913 has not been checked (NO in step S901), in step S902, the number corresponding to the predetermined value 913 is checked by referring to the determination table 911, and the processing returns to step S901. Then, in step S903, a difference between the number of images of the person A illustrated in FIG. 7 and the number of images in the item 701 is calculated, and whether the difference is greater than or equal to the predetermined value is determined. When it is determined as a result of the checking that the difference is greater than or equal to the predetermined value (YES in step S903), in step S904, it is determined to perform updating processing on the face dictionary of the person A in step S810. In other words, it is determined to be YES in step S810. On the other hand, when it is determined that the difference is less than the predetermined value (NO in step S903), in step S905, it is determined not to perform updating processing for the face dictionary of the person A in step S810. In other words, it is determined to be NO in step S809.

Thus, according to the present exemplary embodiment, accuracy of the face dictionary can be enhanced, and an increase in processing can be prevented by suppressing the updating frequency.

Next, a third exemplary embodiment will be described.

In the present exemplary embodiment, an example of control of updating a face dictionary by photographing date and time in view of reduction in reliability of an old face image with time will be described. A configuration of an imaging apparatus or a PC, a configuration of a face dictionary and processing for updating the face dictionary, according to the present exemplary embodiment are similar to those of the first exemplary embodiment. In the preset exemplary embodiment, only differences from the first exemplary embodiment will be described.

Figure 10:
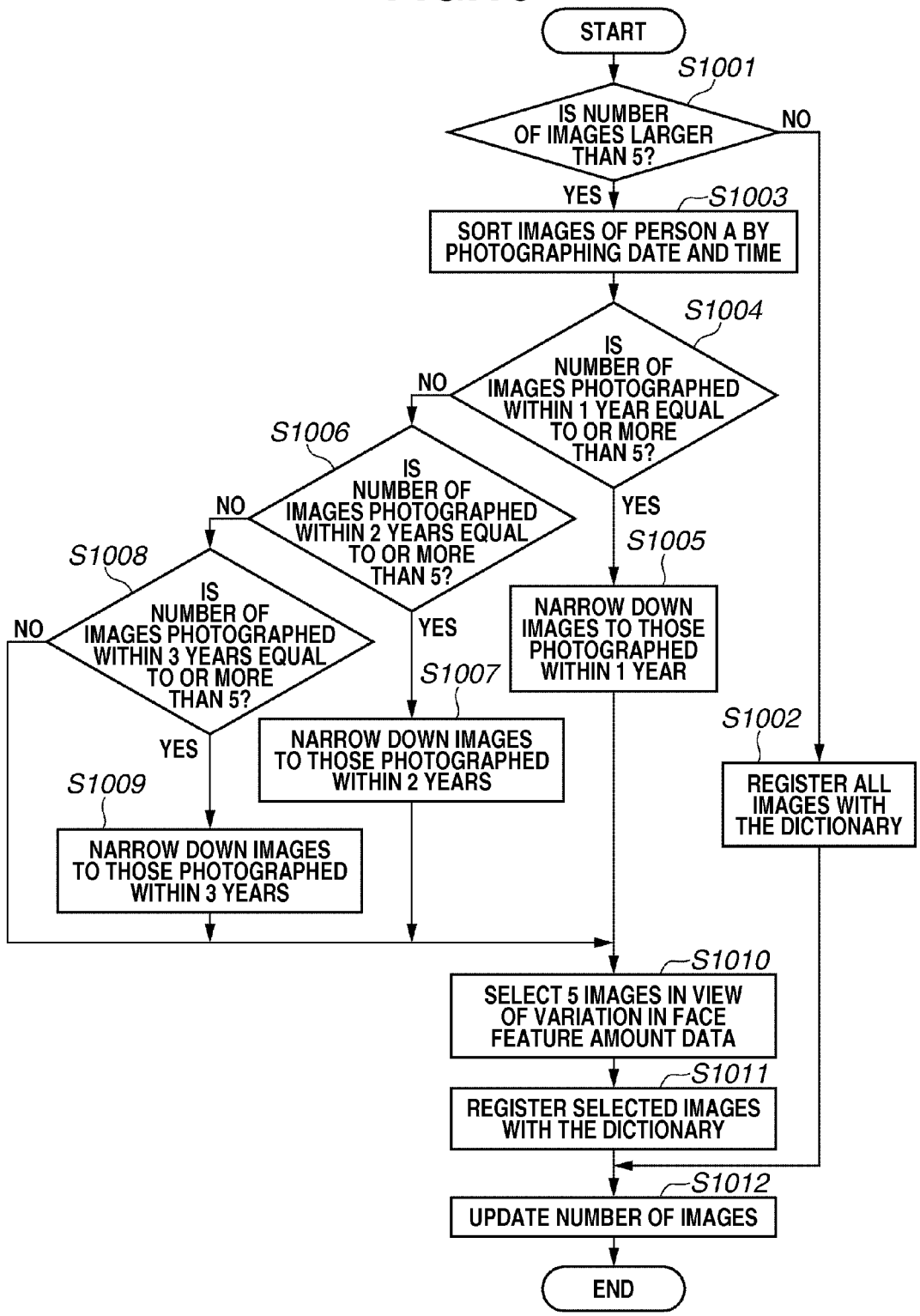
FIG. 10 is a flowchart illustrating an example of a processing procedure for updating the face dictionary in step S810 illustrated in FIG. 8 according to the third exemplary embodiment.

FIG. 10 is a flowchart illustrating an example of a processing procedure for updating the face dictionary in step S810 illustrated in FIG. 8.

First, in step S1001, whether a number of images of a person A in the item 702 illustrated in FIG. 7 is larger than a predetermined number is determined. In the present exemplary embodiment, for example, the predetermined number is 5. When it is determined that the number of images is greater than or equal to 5 (NO in step S1001), in step S1002, all the images are registered with the face dictionary. In other words, as illustrated in FIG. 7, face image data and face feature amount data are registered with the face dictionary.

When it is determined that the number of images is greater than 5 (YES in step S1001), in step S1003, photographing date and time by referring to information about photographing date and time in metadata of the images of the person A. In step S1004, whether 5 or more images captured within a predetermined period are present is checked. For example, the predetermined number is 1 year. When it is determined that 5 or more images captured within the predetermined period (1 year) are present (YES in step S1004), in step S1005, images are narrowed down to only these images.

On the other hand, when it is determined that the number of images is less than 5 (NO in step S1004), in step S1006, whether 5 or more images captured, for example, within 2 years are present is checked. When it is determined that 5 or more images are present (YES in step S1006), in step S1007, images are narrowed down to only the images captured within 2 years. When it is determined that the number of images is smaller than 5 (NO in step S1006), in step S1008, whether 5 or more images captured, for example, within 3 years are present is checked. When it is determined that 5 or more images are present (YES in step S1008), in step S1009, images are narrowed down to only the images captured within 3 years. When it is determined that the number of images is less than 5 (NO in step S1008), the processing proceeds to step S1010.

Then, in step S1010, face feature amount data similar to one another are eliminated from the narrowed-down images of the person A, and 5 images are selected from feature amount data different from one another. In step S1011, the selected 5 images are registered with the face dictionary. In step S1012, the number of images of the item 701 is updated to that of the item 702 illustrated in FIG. 7.

Thus, according to the present exemplary embodiment, since the face dictionary is created focused on recent images, a new image to be added is a newly captured image, and searching accuracy may be improved. In the present exemplary embodiment, in step S809 illustrated in FIG. 8, whether to update the face dictionary is determined according to the processing procedure illustrated in FIG. 12. However, whether to update the face dictionary may be determined according to the procedure of the second exemplary embodiment.

Next, a fourth exemplary embodiment will be described.

In the present exemplary embodiment, in addition to the processing of the first, second and third exemplary embodiments, updating processing of a face dictionary when a name of a person of an image registered with the face dictionary is changed or when the image is deleted will be described. A configuration of an imaging apparatus or a PC, a configuration of a face dictionary, and processing for updating the face dictionary, according to the present exemplary embodiment are similar to those of the first exemplary embodiment. In the preset exemplary embodiment, only differences from the first exemplary embodiment will be described.

Figure 11A:
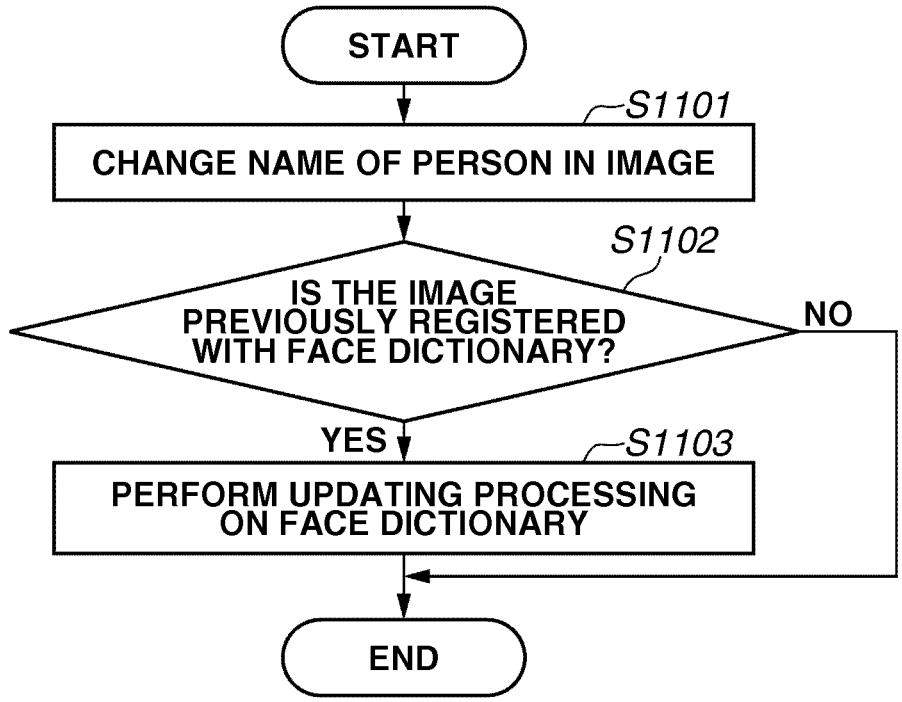
FIGS. 11A and 11B are flowcharts illustrating examples of processing procedures for determining updating of the face dictionary illustrated in FIG. 7 by changing or deleting a name of a person.

FIG. 11A is a flowchart illustrating an example of a procedure for determining updating of the face dictionary when the name of the person of the image is changed according to the present exemplary embodiment.

First, when a changing instruction of the name of the person has been received from an operation unit 108, in step S1101, a name of a person registered with metadata of a target image is changed. In step S1102, whether the image is registered with the face dictionary is checked. In this processing, whether the image has a change in person's name is checked by comparing pathnames of images registered with the item 706 of the face dictionary illustrated in FIG. 7. When it is determined as a result of checking that the image is not registered with the face dictionary (NO in step S1102), the processing is ended. On the other hand, when it is determined as a result of checking that the image is registered with the face dictionary (YES in step S1102), the image registered with the face dictionary is that of a different person. Thus, in step S1103, updating processing of the face dictionary is performed according to the procedure of the third exemplary embodiment illustrated in FIG. 10.

Figure 11B:
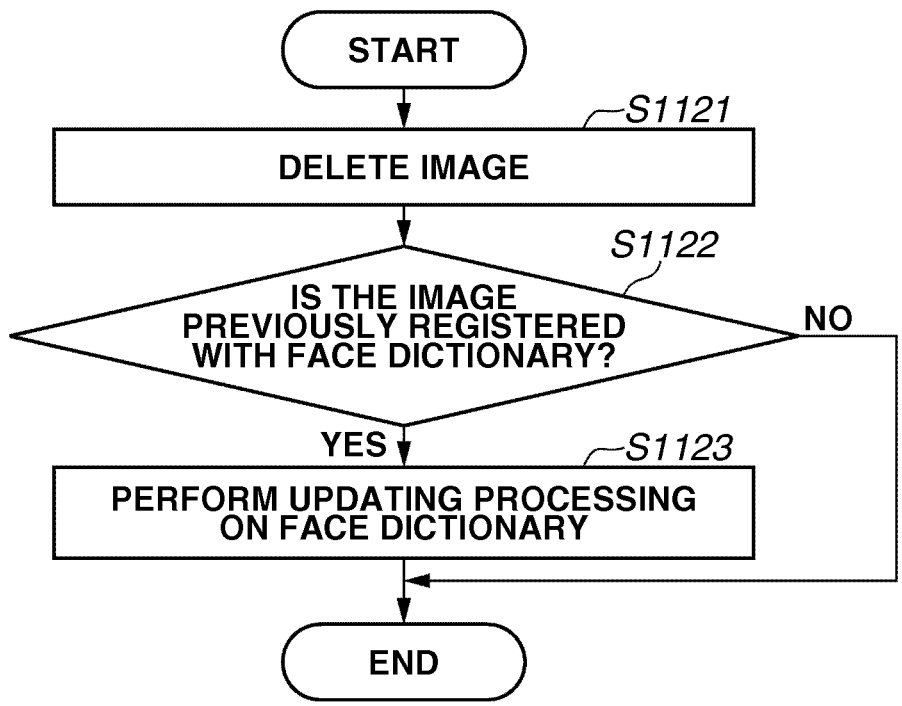

FIG. 11B is a flowchart illustrating an example of a procedure for determining updating of the face dictionary when the image is deleted according to the present exemplary embodiment.

First, when a deleting instruction of an image stored in a storage medium 106 has been received from the operation unit 108, in step S1121, the target image is deleted. In step S1122, whether the deleted image is registered with the face dictionary is checked. In this processing, similarly, whether the image is a deleted image is checked by comparing pathnames of the images registered with the item 706 of the face dictionary illustrated in FIG. 7. When it is determined as a result of checking that the image is not registered with the face dictionary (NO in step S1122), the processing is ended. On the other hand, when it is determined as a result of checking that the image is registered with the face dictionary (YES in step S1122), a face image registered with the face dictionary has been deleted. Thus, in step S1123, updating processing of the face dictionary is performed according to the procedure illustrated in FIG. 10.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-170194 filed Jul. 31, 2012, which is hereby incorporated by reference herein in its entirety.

What is claimed is:

1. An information processing apparatus comprising:
a processor;
a storage configured to store a plurality of image data and a face dictionary in which, as image data for identification of a person, a plurality of face images has been registered in association with the person, an upper limit having a predetermined number of image data that are able to be registered in the face dictionary per the person; and
a memory having stored thereon instructions that when executed by the processor, cause the processor to:
specify a number of image data in which a face of the person registered with the face dictionary among the image data stored in the storage exists; and
update the face dictionary by reselecting the predetermined number of image data, not in excess of the upper limit, of images to be used for the face dictionary according to the specified number of image data;
wherein the processor decreases a frequency for updating the face dictionary as the image data associated with the person increases beyond the upper limit.

2. The information processing apparatus according to claim 1, wherein the processor controls updating based on a change in an amount of the specified number from a last updating of the face dictionary.

3. The information processing apparatus according to claim 1, wherein the processor updates the face dictionary when the specified number reaches a multiple of a predetermined value.

4. The information processing apparatus according to claim 1, wherein the specification does not count images older than a predetermined time reference as the number of images corresponding to the person registered with the face dictionary.

5. The information processing apparatus according to claim 1, wherein determination is performed based on whether a name of the person is included in attribute information of the image.

6. The information processing apparatus according to claim 1, wherein, when the specified number is less than or equal to a maximum number of face images to be registered with the face dictionary, face images of all the images are registered with the face dictionary.

7. The information processing apparatus according to claim 1, further comprising a database configured to store similarity information based on the face dictionary for each image stored in the storage,
wherein similarity to be stored in the database is recalculated according to updating the face dictionary.

8. The information processing apparatus according to claim 1, wherein the processor adjusts a frequency for updating the face dictionary as a difference in time between the predetermined number of image data increases or decreases.

9. A method for controlling an information processing apparatus including a storage configured to store a plurality of image data and a face dictionary in which, as image data for identification of a person, a plurality of face images has been registered in association with the person, an upper limit having a predetermined number of image data that are able to be registered in the face dictionary per the person; and configured to perform face authentication using the face dictionary, the method comprising:
specifying a number of image data in which a face of the person registered with the face dictionary among the image data stored in the storage exists; and updating the face dictionary by reselecting the predetermined number of image data, not in excess of the upper limit, of images to be used for the face dictionary according to the specified number of image data;

wherein the processor decreases a frequency for updating the face dictionary as the image data associated with the person increases beyond the upper limit.

10. A non-transitory computer-readable storage medium storing a program that causes a computer to execute the method according to claim 9.

11. The information processing method according to claim 9, wherein the information processing apparatus increases a frequency for updating the face dictionary as the specified number becomes less.

12. The information processing method according to claim 9, wherein the information processing apparatus controls updating based on a change in an amount of the specified number from a last updating of the face dictionary.

13. The information processing method according to claim 9, wherein the information processing apparatus updates the face dictionary when the specified number reaches a multiple of a predetermined value.

14. The information processing method according to claim 9, wherein the specification of a number of images does not count images older than a predetermined time reference as the number of images corresponding to the person registered with the face dictionary.

15. The information processing method according to claim 9, wherein determination is performed based on whether a name of the person is included in attribute information of the image.

16. The information processing method according to claim 9, wherein, when the specified number is less than or equal to a maximum number of face images to be registered with the face dictionary, face images of all the images are registered with the face dictionary.

17. The information processing method according to claim 9, wherein the processor adjusts a frequency for updating the face dictionary as a difference in time between the predetermined number of image data increases or decreases.

* * * * *